(12) United States Patent
Inhelder

(10) Patent No.: US 12,359,993 B2
(45) Date of Patent: Jul. 15, 2025

(54) FORCE MEASURING DEVICE FOR MEASURING WEB TENSIONS OF A RUNNING MATERIAL WEB

(71) Applicant: FMS Force Measuring Systems AG, Oberglatt (CH)

(72) Inventor: Jörg Inhelder, Nürensdorf (CH)

(73) Assignee: FMS Force Measuring Systems AG, Oberglatt (CH)

( * ) Notice: Subject to any disclaimer, the term of this patent is extended or adjusted under 35 U.S.C. 154(b) by 359 days.

(21) Appl. No.: 17/917,327

(22) PCT Filed: Mar. 23, 2021

(86) PCT No.: PCT/EP2021/057456
§ 371 (c)(1),
(2) Date: Oct. 6, 2022

(87) PCT Pub. No.: WO2021/204535
PCT Pub. Date: Oct. 14, 2021

(65) Prior Publication Data
US 2023/0152171 A1 May 18, 2023

(30) Foreign Application Priority Data
Apr. 6, 2020 (EP) ..................... 20168263

(51) Int. Cl.
*G01L 5/107* (2020.01)
*G01L 5/10* (2020.01)
*G01L 5/108* (2020.01)

(52) U.S. Cl.
CPC ............... *G01L 5/107* (2013.01); *G01L 5/10* (2013.01); *G01L 5/108* (2013.01)

(58) Field of Classification Search
CPC . G01L 5/10; G01L 5/107; G01L 5/108; G01L 5/0009; G01L 5/0014; G01L 5/0019; G01L 5/0023; G01L 17/00
See application file for complete search history.

(56) References Cited

U.S. PATENT DOCUMENTS

| 4,289,005 A | * | 9/1981 | Cabaret | ................... G01B 7/345 73/159 |
| 7,698,963 B2 | | 4/2010 | Herhaus | |
| 2018/0127227 A1 | * | 5/2018 | Nishimura | ............. B65H 35/02 |

FOREIGN PATENT DOCUMENTS

DE 3735022 A1 12/1988

OTHER PUBLICATIONS

International Preliminary Report on Patentability from International Application No. PCT/EP2021/057456 dated Oct. 6, 2022.
(Continued)

*Primary Examiner* — Paul M. West
(74) *Attorney, Agent, or Firm* — Frank Rosenberg

(57) ABSTRACT

The present invention relates to a force measuring device (20) for measuring web tensions of a running material web (10) that comprises a longitudinal direction defined by the running direction, and a transverse direction, the force measuring device (20) comprising an axle (22) and, supported on the axle, a measuring roll (30) wrapped around by the material web. Here, according to the present invention, it is provided that the measuring roll is formed as a segmented measuring roll (30) having two or more measuring segments (32) that are slidable separately on the axle (22) and are lockable in a measuring position on the axle in order to position the measuring segments (32) in the transverse direction of the material web (10) in accordance with desired measuring positions such that longitudinal sections (12) of the material web wrap around one measuring segment (32) each. The measuring segments (32) each comprise a load
(Continued)

Figure 1:
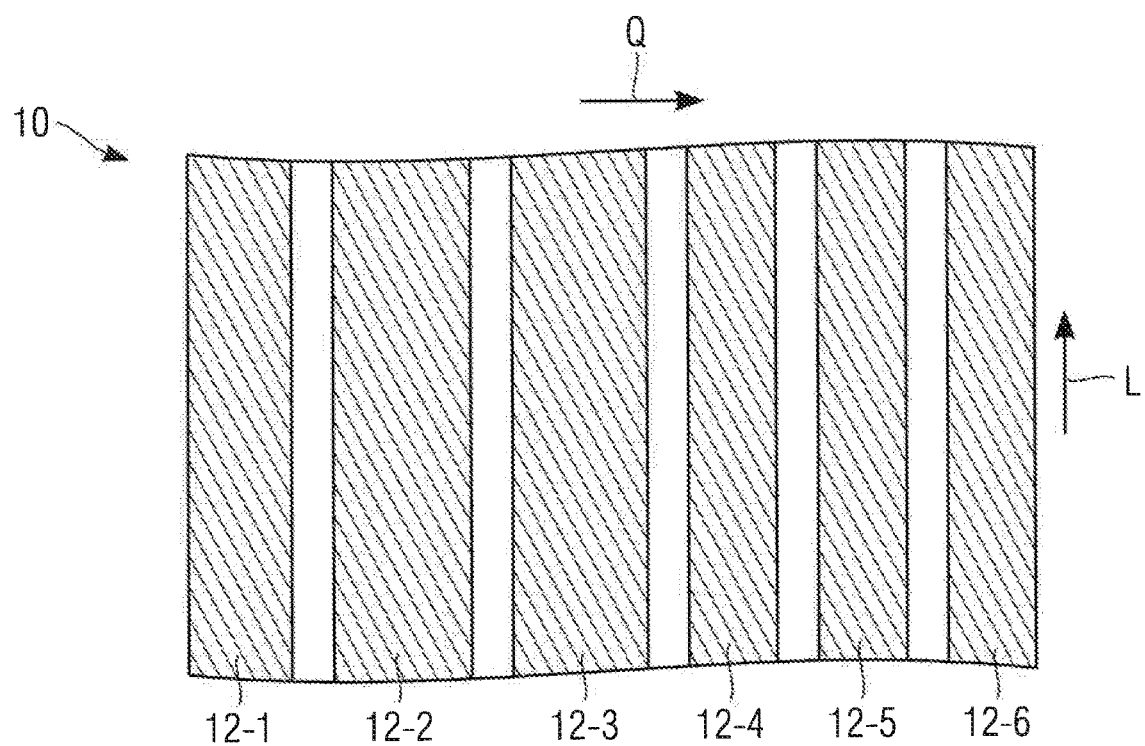

cell (36) that serves to determine the web tension of the longitudinal section (12) of the material web wrapped around the respective measuring segment (32) and that provides a mount with which the measuring segment (32) sits on the axle (22). The axle (22) is furnished with electrical conductors that extend substantially in the axial direction across the entire width (26), that are contactable at every position axially and with which the measuring signals provided by the load cells (36) of the measuring segments (22) are conductible to an evaluation unit arranged at an axle end (28).

20 Claims, 5 Drawing Sheets

(56) References Cited

OTHER PUBLICATIONS

Written Opinion of the International Search Authority from International Application No. PCT/EP2021/057456 date of mailing May 31, 2021.
International Search Report from International Application No. PCT/EP2021/057456 date of mailing May 31, 2021.
Machine Translation of DE 3735022 A1.
European Search Report in Application No. EP20168263.0A dated Aug. 31, 2020.

* cited by examiner

FORCE MEASURING DEVICE FOR MEASURING WEB TENSIONS OF A RUNNING MATERIAL WEB

RELATED APPLICATIONS

This application is a national stage filing and claims the priority benefit of PCT/EP2021/057456, filed 23 Mar. 2021, and also claims the benefit of European Patent Application No. EP 20 168 263.0, filed 6 Apr. 2020.

The present invention relates to a force measuring device for measuring web tensions of a running material web that comprises a longitudinal direction defined by the running direction, and a transverse direction perpendicular thereto. Here, the force measuring device comprises an axle and, supported on the axle, a measuring roll wrapped around by the material web.

In systems for manufacturing or further processing web-shaped materials, for example paper, plastic foils or aluminum foils, the material webs are processed at the beginning of the processing operation with web widths of a few meters. Often, for further processing, for example in label printing or packaging manufacture, considerably narrower webs are required and for this, the material webs are cut into narrower longitudinal strips of the desired width on slitter winders. Conventional force measuring devices measure the web tension of the entire material web over the full roll width, but for the further processing of cut webs, it would be advantageous to obtain more precise information about the distribution of the web tension along the transverse direction of the running web.

This is where the present invention begins. The object of the present invention, as characterized in the claims, is to specify a force measuring device of the kind mentioned above with which the distribution of the web tension along the transverse direction of a running material web can be measured.

Said object is solved by the features of the independent claims. Developments of the present invention are the subject of the dependent claims.

According to the present invention, in a generic force measuring device, it is provided that
   the measuring roll is formed as a segmented measuring roll having two or more measuring segments that are separately slidable on the axle and lockable in a measuring position on the axle in order to position the measuring segments in the transverse direction of the material web in accordance with desired measuring positions such that longitudinal sections of the material web wrap around one measuring segment each,
   the measuring segments each comprise a load cell that serves to determine the web tension of the longitudinal section of the material web wrapped around the respective measuring segment and that provides a mount with which the measuring segment sits on the axle, and
   the axle is furnished with electrical conductors that extend substantially in the axial direction across the entire width, that are contactable at every position axially and with which the measuring signals supplied by the load cells of the measuring segments are conductible to an evaluation unit arranged at an axle end.

The electrical conductors of the axle can be arranged in an inner axial chamber, for example the guide chamber described in greater detail below, but they can also be arranged on the exterior of the axle, for example in an axial exterior groove of the axle. Here, it is important only that the electrical conductors are contactable at every position axially at which measuring segments are lockable, that is, substantially at every position along the width of the axle, such that, regardless of the respective measuring positions of the measuring segments, they can conduct to the evaluation unit the measuring signals supplied by the load cells.

Here, the measuring segments expediently comprise, in addition to the load cell, a roll shell and, supported by the load cell, a bearing for the roll shell. In one preferred embodiment, the load cell includes in each case, lying on the axle, an inner ring that provides the said mount. The load cell further comprises a concentric outer ring that is slidable with respect to the inner ring upon the application of force, and a measuring section that connects the inner ring and outer ring in a connecting region. When measuring the web tension, due to the application of force, the outer ring is slid radially relative to the inner ring and, as a result, tensions are produced in the measuring section that can be measured by means of strain gauges.

The inner ring particularly advantageously comprises an indentation in which the connecting region with the outer ring is accommodated. The indentation can extend radially up to half the radius of the inner ring, preferably even to the middle of the inner ring. The load cell is advantageously guided in an axial guide chamber of the axle with the indentation of the inner ring. In this way, a particularly compact architecture of the load cell and the force measuring device is achieved and, moreover, the load cell is integrated with the axle of the force measuring device.

According to one advantageous variant of the present invention, the inner ring and the outer ring are arranged radially nested and are connected in a radial connecting region by the measuring section. As overload protection, the inner ring and the outer ring are preferably separated outside the connecting region by a narrow radial gap whose width is dimensioned such that, in the event of overload, the movable outer ring rests against the inner ring fixed on the axle. The gap width corresponds, for example, to 110% of the measuring path at nominal load and is typically in the range of a few tenths of a millimeter.

In another, likewise advantageous embodiment, the inner ring and the outer ring are arranged spaced apart axially and are connected in an axial connecting region by the measuring section.

The load cell is advantageously furnished with strain gauges for measuring the web tension. Preferably, the measuring section that connects an inner ring and outer ring is furnished with the said strain gauges for measuring the mechanical tension produced in the measuring section.

In one advantageous embodiment, the measuring section is formed in the form of a double-bending beam.

The inner ring, the outer ring and the measuring section of the load cell are particularly advantageously formed to be one piece.

According to one preferred embodiment, the axle is formed as an extruded profile. The extruded profile preferably comprises a vertical ridge and two horizontal guide rails that extend from the vertical ridge, such that the vertical ridge and the two guide rails form a U-shaped axial guide chamber in the extruded profile of the axle.

Alternatively, the axle can also be formed as a milled axle, in which the axial guide chamber and, if applicable, further indentations, such as an axial groove for an air hose and a pressure strip, are milled into a round bar. The manufacture of the axle as a milling element is simple and inexpensive, but permits no radially closed hollow spaces and thus generally entails a higher weight than extruded profiles of the same bend resistance have.

The axle is advantageously furnished in a guide chamber with axially running power rails that are contactable at an arbitrary axial position of current collectors in the load cells of the measuring segments and that form said electrical conductors. Particularly advantageously, in the axial guide chamber, both the load cell is guided with the indentation of the inner ring, and the axially running power rails are arranged.

The measuring segments preferably each include an electronics unit for supplying the strain gauges and for receiving, for preamplifying, preferably in addition to digitalizing, and for discharging the preamplified and, if applicable, digitalized measuring signals into the electrical lines, especially the power rails in the axle. A digitalization of the measuring signals is advantageous especially when the segmented measuring roll comprises a larger number of measuring segments, for example four or more or six or more measuring segments, since the digitalized measuring signals can then, using a bus protocol, be conducted to the evaluation unit via a few, typically two, power lines. Especially when the segmented measuring roll includes only a small number of measuring segments, the measuring signals can, of course, also be conducted to the evaluation unit in analog form, each via its own power line.

For measuring the rotational speed, every measuring segment is advantageously furnished with a device for measuring the rotational speed, the device preferably comprising one or more magnets that rotate with the roll shell, and a static Hall effect generator connected with the load cell. From the Hall voltage produced upon rotational, the rotational speed of every measuring segment can be determined in the manner known to the person of skill in the art, and conducted to the evaluation unit via the electronics unit. The individual determination of the rotational speed of every measuring segment permits especially the determination whether slip occurs in one or more measuring segments in operation.

In one preferred embodiment, the axle includes, in an axial groove, an air hose and a pressure strip for locking the measuring segments on the axle. Here, the evaluation unit preferably includes a pressure sensor for monitoring the air pressure of the air hose. In the event of a deviation of the air pressure from the target value, the evaluation unit can, for example, emit a warning signal or initiate other suitable measures.

In one advantageous embodiment, the measuring segments are each furnished with lateral spacers whose size is coordinated with the size of the respective roll shell in such a way that the measuring segments can be slid together on the axle in such a way that the roll shells lie next to one another practically without gaps, but without touching one another. In practice, this means clearances of the roll shells in the slid-together state of a few tenths of a millimeter up to about one millimeter.

On the axle are advantageously positioned and locked two or more, especially three or more, four or more or even six or more measuring segments, such that the measuring roll is formed as a segmented measuring roll having two or more, three or more, four or more or even six or more measuring segments.

In one advantageous embodiment, the measuring segments are each positioned and locked on the axle with spaced apart roll shells, such that the segmented measuring roll is adapted and configured especially for measuring the web tensions of the longitudinal strips of a cut running material web. The number and the positions of the measuring segments and the width of their roll shells are expediently adapted to the number, the positions and the widths of the cut longitudinal strips of the material web.

In another, likewise advantageous embodiment, the measuring segments are positioned and locked on the axle in such a way that their roll shells are adjacent practically without gaps without touching each other. The segmented measuring roll is then adapted and configured especially for measuring the web tensions of the longitudinal sections of an uncut running material web and thus for the measuring of a tension profile in the transverse direction of the material web. The number and the positions of the measuring segments and the width of their roll shells are expediently adapted to the resolution requirements for the measuring of the tension profile.

The force measuring device according to the present invention enables the measuring of the web tensions in the transverse direction of a running material web both in the individual longitudinal strips of a cut web and locally in the longitudinal sections of an uncut web. It is understood that, during operation of the force measuring device, the slidable and lockable measuring segments are each locked in a certain position that corresponds to the location of the desired web tension measurement. If another tension profile or the web tension of another longitudinal strip configuration is to be subsequently measured with the force measuring device, the lockings are disengaged and the measuring segments are slid on the axle accordingly and relocked. If another number of measuring segments is required, or if measuring segments of another width are required, measuring segments can also be removed from the axle and/or additional or different measuring segments of desired width pushed onto the axle. The described force measuring device can thus be adapted very flexibly to the respective measuring job and the measuring requirements.

By measuring the web tensions of the longitudinal strips of a cut web, it becomes possible to individually control the winding process and thus avoid a lot of waste due unsuitable tension conditions in individual longitudinal strips. Knowing the tension profile is often of great benefit with uncut material webs, as well. For example, when manufacturing blown films, by measuring the tension profile of the film tube produced, the cooling profile of the molten tube can be readjusted to obtain a uniform tension profile of the film tube.

Further exemplary embodiments and advantages of the present invention are explained below by reference to the drawings, in which a depiction to scale and proportion was dispensed with in order to improve their clarity.

Figure 2:
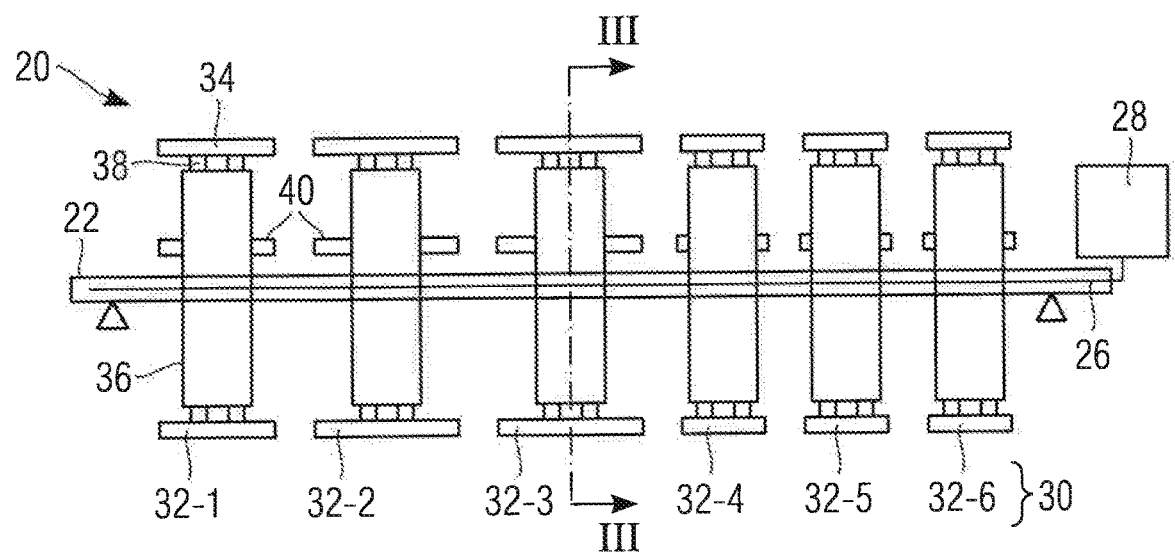
Figure 3:
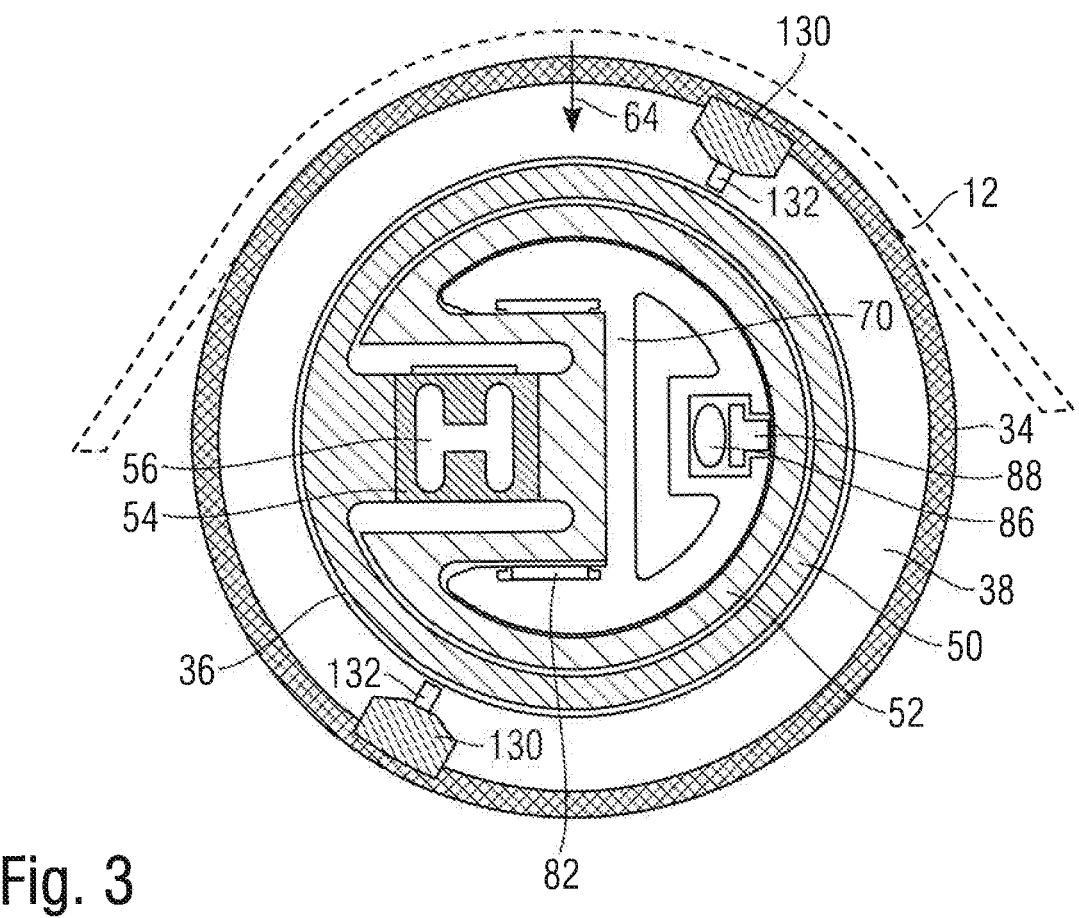
Figure 4:
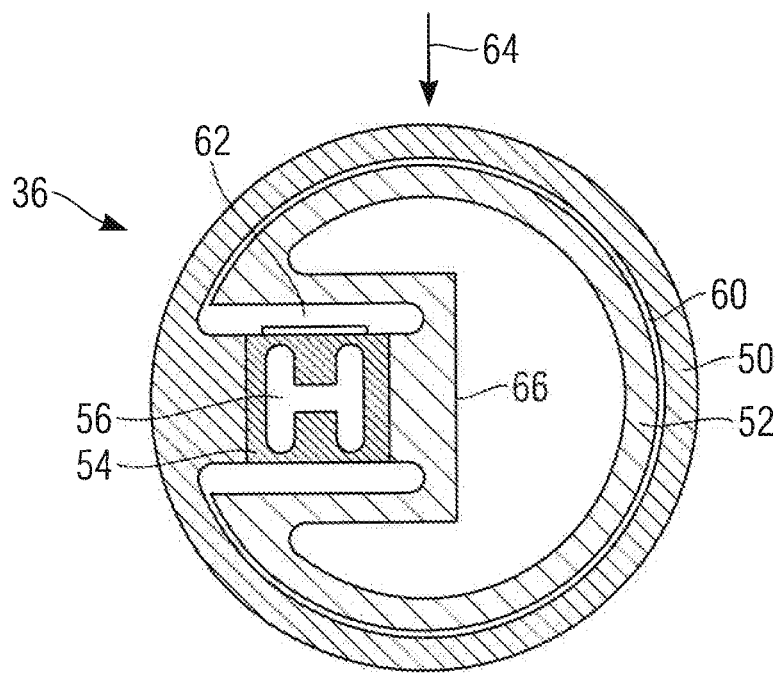
Figure 5:
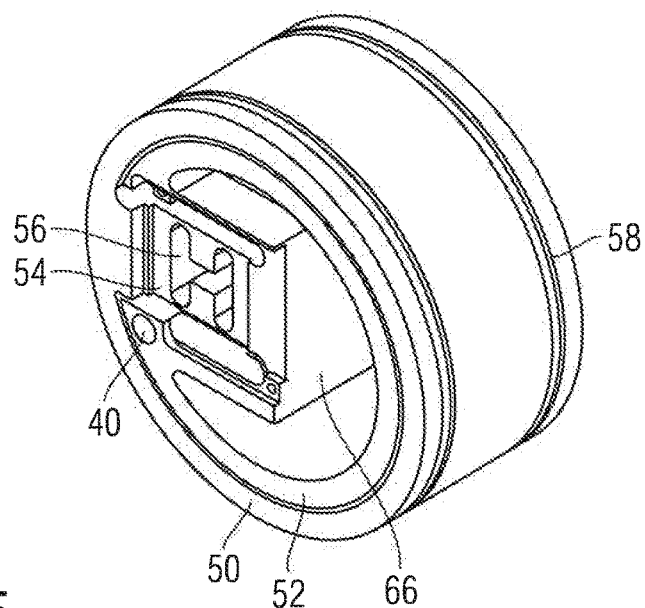
Figure 6:
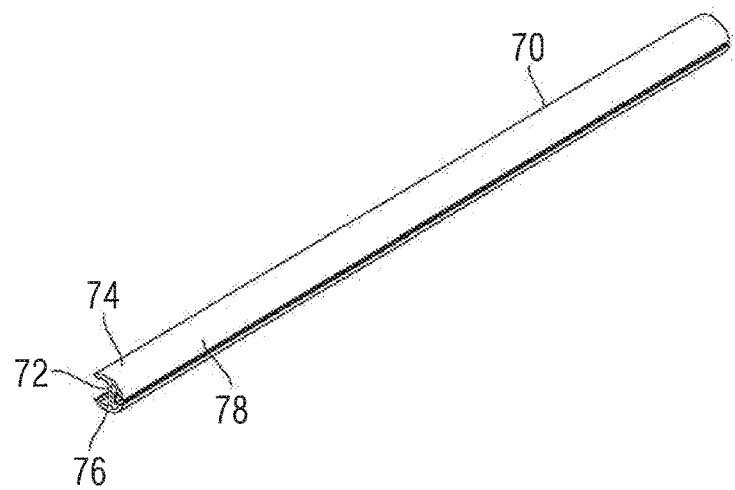
Figure 7:
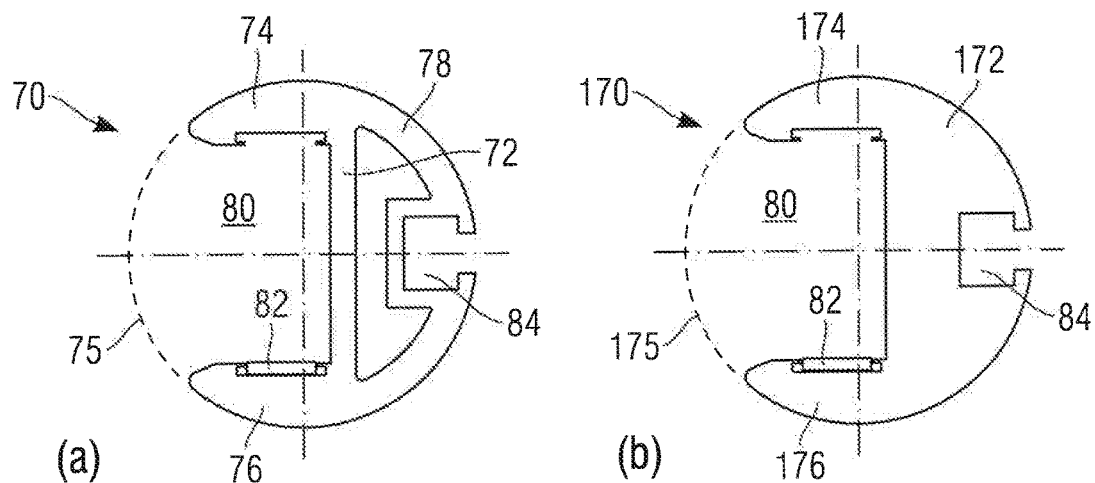
Figure 8:
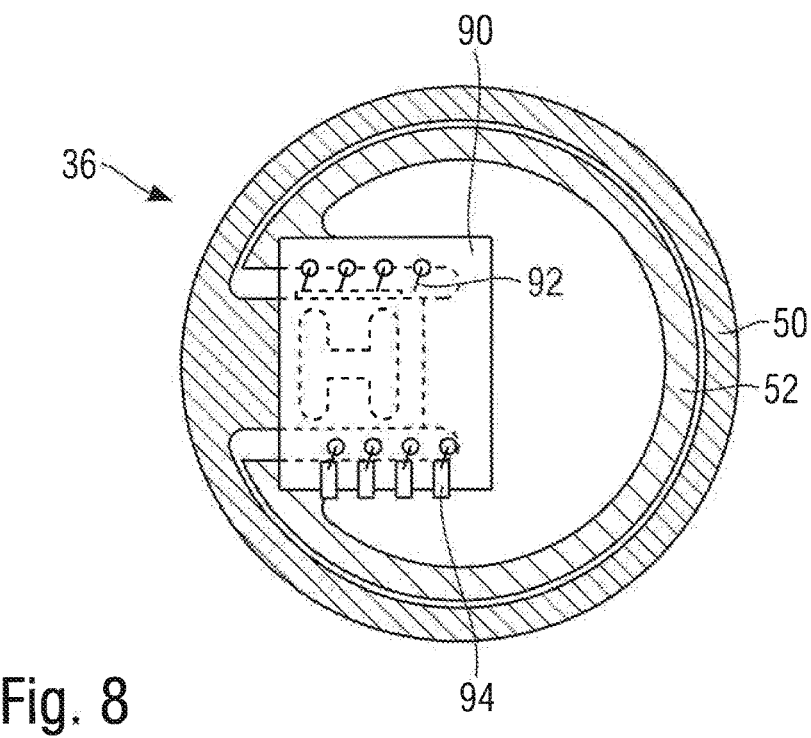
Figure 9:
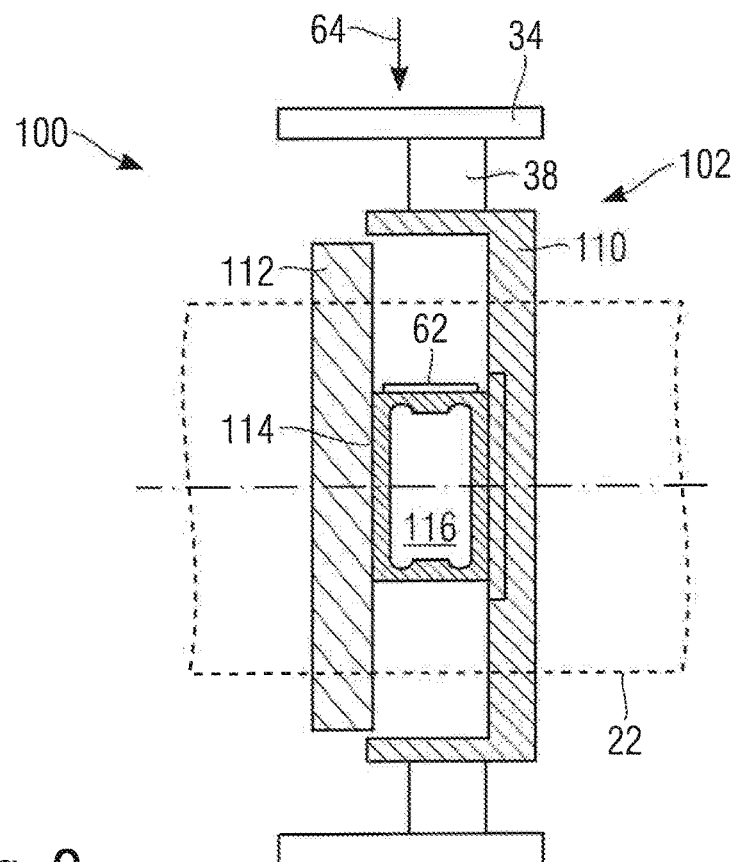
Figure 10:
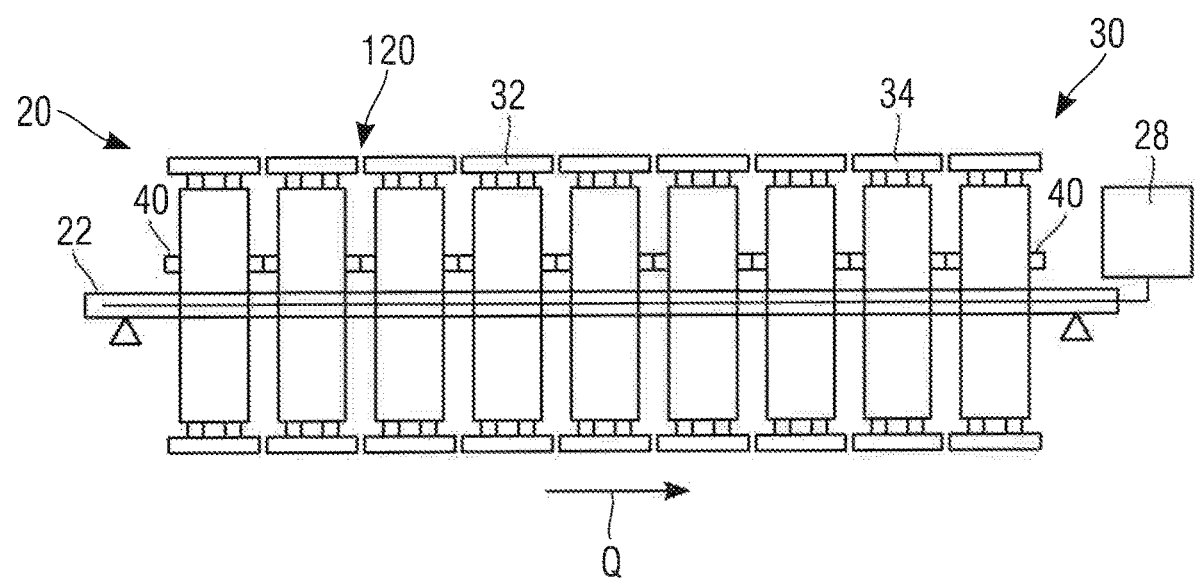
Figure 11:
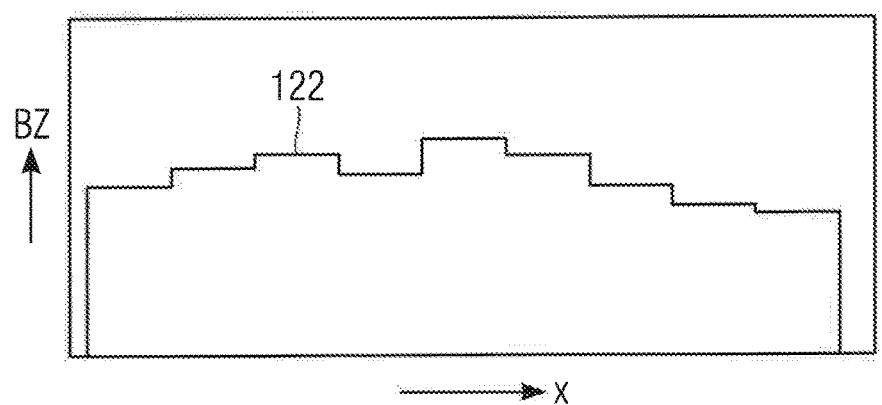

Shown are:

FIG. 1 schematically, a material web, cut into longitudinal strips, in which the web tensions of the longitudinal strips are to be measured individually, FIG. 2 schematically, a force measuring device according to the present invention, FIG. 3 a cross section through a force measuring device according to the present invention in a direction corresponding to the line III-III in FIG. 2, FIG. 4 the load cell of a measuring segment of the force measuring device in FIG. 3 separately, in cross section, FIG. 5 a perspective view of the load cell in FIG. 4, FIG. 6 the axle of the force measuring device in FIG. 3 separately, in perspective view, FIG. 7 in (a) the axle in FIG. 6 in cross section, in (b) a milled axle according to a further exemplary embodiment of the present invention, FIG. 8 the load cell in FIG. 4 with the electronics circuit board and the contact regions with the strain gauges and the power rails of the axle drawn in, FIG. 9 a load cell according to the present invention having a measuring section that runs in the axial direction, in cross section, FIG. 10 schematically, a force measuring device according to the present invention configured for recording the tension profile of an uncut material web, and FIG. 11 schematically, a tension profile of an uncut material web, measured with the force measuring device in FIG. 10, in which the force F is plotted over the dimension x in the transverse direction.

The present invention will now be explained using the example of a force measuring device for measuring web tensions of a cut running material web.

FIG. 1 shows, by way of example, a material web 10 whose running direction defines a longitudinal direction L and a transverse direction Q perpendicular thereto. In the exemplary embodiment, the material web 10 is cut into n=6 longitudinal strips, namely having one longitudinal strip 12-1 of average width, two wider longitudinal strips 12-2, 12-3 and three narrower longitudinal strips 12-4, 12-5, 12-6.

For the subsequent winding process of the longitudinal strips, it is advantageous to know the web tension in each of the strips individually. While conventional measuring devices permit only a measuring of the web tension of the entire web 10 over the full roll width, the inventive force measuring device 20 described below enables separate measuring of the web tension in every single one of the plurality of longitudinal strips 12-$i$ (i=1 ... 6) of the material web 10.

FIG. 2 shows, diagrammed schematically, a force measuring device 20 according to the present invention. The force measuring device 20 includes a bend-resistant axle 22 that lies at both of its ends on an on-site substructure, not shown. Supported on the axle 22 is a measuring roll 30 that, in operation, is wrapped around by the material web 10 to be measured.

According to the present invention, the measuring roll is formed as a segmented measuring roll 30 that, in the exemplary embodiment, serves to measure the web tension of the 6 longitudinal strips 12-$i$ of the material web 10 in FIG. 1 and thus consists of n=6 measuring segments 32-$i$, where i=1 ... 6, adapted to the longitudinal strips 12-$i$.

As in FIG. 2, the measuring segments 32-$i$ can differ in their width, especially the width of their roll shell, but otherwise they are preferably formed identically with their structural features. The following description of a measuring segment thus pertains to all measuring segments 32-$i$ of the measuring roll 30, such that, for the sake of simplicity, the index i is usually omitted.

The measuring segments 32 are separately slidable on the axle 22 and lockable in a measuring position on the axle to be able to position them in the transverse direction Q of the material web 10 in accordance with the desired measuring positions in such a way that the longitudinal strips 12-$i$ of the material web 10 each lie on a roll shell 34 of an associated measuring segment 32-$i$ and wrap around said roll shell. The roll shell 34 of the measuring segments is, in each case, connected via a rolling bearing 38 with a load cell 36 that serves to determine the web tension of the longitudinal section 12 of the material web 10 wrapped around the respective measuring segment. Moreover, the load cell 36 provides a mount with which the respective measuring segment 32 sits on the axle 22.

The width of the roll shells 34 of the measuring segments 32 is adapted to the width of the associated longitudinal strips 12 of the material web, as depicted in FIGS. 1 and 2. In the exemplary embodiment, the measuring roll 30 thus consists of a measuring segment 32-1 having a roll shell of average width, two measuring segments 32-2, 32-3 having wider roll shells and three measuring segments 32-4, 32-5, 32-6 having narrower roll shells.

The axle 22 is furnished with electrical conductors 26 that extend substantially in the axial direction across the entire width, that are contactable at every position axially and with which the measuring signals supplied by the load cells 36 of the measuring segments 32 are conducted to an evaluation unit arranged at an axle end 28. Here, the electrical conductors 26 can be arranged on the exterior of the axle 22, for example in an axial groove, but they can advantageously also be present in a guide chamber in the axle, described in greater detail below. The measuring segments 32 are further furnished with spacers 40 whose function is explained in greater detail at FIG. 10.

One advantageous development of the measuring segments 32 and the axle 70 of a force measuring device according to the present invention will now be described in greater detail with reference to FIGS. 3 to 7. Here, FIG. 3 shows a cross section through the force measuring device 20 in a direction corresponding to the line III-III in FIG. 2. The load cell 36 of a measuring segment 32 alone is depicted in FIG. 4 in cross section and in FIG. 5 in perspective view, the axle 70 alone is shown in perspective view in FIG. 6, and in FIG. 7 in cross section.

With reference first to FIG. 3, the measuring segment 32 includes, radially from exterior to interior, a roll shell 34, a rolling bearing 38 and a load cell 36. The longitudinal strip 12 of the material web 10, wrapped around the measuring segment 32, is indicated with dashed lines.

Here, the load cell 36, which is depicted again separately in FIGS. 4 and 5, comprises an outer ring 50, a concentric inner ring 52 and a measuring section 54 having an H-shaped recess 56. The outer ring 50 comprises notches 58 (FIG. 5) for retaining the rolling bearing 38 via retaining rings, not shown, the inner ring 52 lies on the axle 70 and provides the above-mentioned mount. In the exemplary embodiment, the inner ring 52 and the outer ring 50 are arranged radially nested and connected in a radial connecting region by the measuring section 54. For this, the inner ring 52 comprises an indentation 66 that extends radially to the center of the inner ring 52. On one hand, the indentation 66 accommodates the connecting region with the outer ring, on the other hand, it serves to securely guide the load cell in the axial guide chamber 80 (FIG. 7) of the axle 70.

The outer ring 50, the inner ring 52 and the measuring section 54 are formed to be one piece, the different hatchings in FIGS. 3 and 4 serve merely to illustrate the different functional regions 50, 52, 54 of the load cell 36.

Outside the connecting region, the inner and the outer ring are separated by a radial gap 60 whose width is dimensioned such that, in the event of overload, the movable outer ring 50 rests against the inner ring 52 fixed on the axle 70 and, in this way, avoids a plastic deformation and thus a destruction of the load cell 36. In the exemplary embodiment, the width of the gap 60 is adapted for 110% of the measuring path at nominal load.

Due to the H-shaped recess 56, the measuring section 54 forms a double-bending beam in which, in the exemplary embodiment shown, strain gauges 62 are arranged on its top side for measuring the mechanical tension on the material surface produced by the application of force. It is understood that strain gauges 62 can also be provided on the bottom side or on both the top and bottom side of the double-bending beam.

The wrapping around of the measuring segment 32 with a longitudinal strip 12 of the material web produces a force 64 that is dependent on the wrap angle and the web tension and that pushes the movable outer ring 50 of the load cell 36 downward with respect to the fixed inner ring 52 and, in this way, leads to a bending of the double-bending beam of the measuring section 54. This bending is measured by the strain gauges 62 and a corresponding electrical signal is produced that is preamplified by an electronics unit in the measuring segment 32 and transmitted in suitable form via the power rails of the axle 70 to the evaluation unit 28.

With reference to FIGS. 3, 6 and 7(a), in the exemplary embodiment shown, the axle 70 is formed as an extruded profile that can accommodate multiple individually measuring measuring segments 32 across its width, as shown schematically in FIGS. 2 and 10. The formation of the axle 70 as an extruded profile enables a bend-resistant formation of the axle, which does not deform, or deforms only minimally, even in the event of maximum load due to high web tensions, and thus does not influence either the geometric arrangement of the measuring segments across the width or the web tension measurement.

In the exemplary embodiment, the extruded profile axle 70 is formed having a circular cross-sectional circumference 75. It includes a central vertical ridge 72 that ensures the stability of the axle, and from which two horizontal guide rails 74,76 and a guide curve 78 extend. Together with the ridge 72, the horizontal guide rails 74,76 form in the axle 70 a U-shaped, axial guide chamber 80 that is open on one side and into which the indentation 66 of the inner ring protrudes for guiding and for electrically connecting the load cell (FIG. 3). The guide curve 78 and the radial outer surfaces of the guide rails 74, 76 are adapted in their curvature to the curvature of the inner ring 52 with tight tolerance such that, on the one hand, the measuring segments 32 are easily slidable on the axle, but on the other hand, are also easily and securely lockable by a, for example, mechanical or pneumatic locking mechanism.

To conduct the electrical signals produced by the strain gauges 62 of the load cell of a measuring segment 32 to the evaluation unit 28, the lower horizontal guide rail 76 of the axle 70 is furnished in a recessed region with axially running power rails 82 that facilitate the power supply and the electrical contact with the measuring segments 32 regardless of their position on the axle 70. It is understood that the power rails can also be provided at another location in the guide chamber, for example on the upper guide rail 74 or also on both guide rails 74, 76.

Instead of an extruded profile, the axle can also be formed as a milled axle 170, as depicted in FIG. 7(b), into which a U-shaped, axial guide chamber 80 and an axial groove 84 are milled. Here, the axle body 172 includes a central vertical supporting structure that ensures the stability of the axle and from which two horizontal guide rails 174, 176 extend to form, together with the axle body 172, within the cross-sectional circumference 175, a U-shaped, axial guide chamber 80 in the axle 70 into which the indentation 66 of the inner ring projects for guiding and for electrically connecting the load cell.

As illustrated in FIG. 8, the load cells 36 include, in addition to the mechanical elements already described, a circuit board 90 having an electronic coupling that, for supplying and receiving the measuring signal, is connected in a contact region 92 with the strain gauges 62 and that, via current collectors 94, can establish contact with the power rails 82 at any arbitrary axial position of the axle 70. In the exemplary embodiment shown, the electronic coupling of the circuit board 90 includes, for processing the signals, a preamplifier that amplifies and digitalizes the measuring signals of the strain gauges 62 and relays the digitalized measuring signal to an internal bus.

Arranged at an end of the axle is the evaluation unit 28 that communicates with the measuring segments 32-i on the axle 70 and receives and further processes their measured values. For this purpose, in the exemplary embodiment, the power rails 82 include, in addition to two power rails for the power supply, two further power rails for a data transmission to the evaluation unit 28, for example according to the RS-485 standard. If a measuring roll includes only a few measuring segments, or if no digitalization is to occur for other reasons, the preamplified measuring signals can, of course, also be conducted to the evaluation unit in analog form, each via its own power rail.

For its part, the evaluation unit 28 communicates via a standardized bus protocol with a higher-level controller that triggers suitable actions based on the measured values provided by the different measuring segments 32, for example causes the drives to run slower or faster, emits an alarm signal, or the like.

The secure locking of the measuring segments 32 on the axle 70 is done in the exemplary embodiment with the aid of an axial air hose 86 and an axial pressure strip 88 (FIG. 3) that are both embedded in a groove 84 formed in the guide curve 78 of the axle 70.

In the slackened state of the air hose 86, the measuring segments 32 are freely slidable on the axle and can be arranged in the desired number at the desired positions on the axle. If the air hose 86 is then inflated, it presses with an air-pressure-dependent force against the pressure strip 88, which is thus pushed radially slightly out of the groove 84. As a result, the pressure strip 88 clamps the positioned measuring segments 32 against a defined stop on the axle 70 and, in this way, simultaneously locks all measuring segments 32 in their correct position. Through a slackening of the air hose 86, the locking is disengaged again and the measuring segments can be slid and/or exchanged. The air pressure of the air hose 86 is monitored by a pressure sensor arranged in the evaluation unit 28 at the end of the axle.

In another variant of the present invention, instead of the air hose and the pressure strip, it is provided that the measuring segments 32 are each furnished with a mechanical locking device through which they can be individually fixed on the axle.

In the exemplary embodiment described in FIGS. 3 to 8, the measuring section 54 runs between the inner and outer rings in the radial direction, which is currently preferred due to the simpler construction and high positive tension. However, it is likewise possible to have the measuring section of a measuring segment run in the axial direction, as explained below with reference to the exemplary embodiment in FIG. 9, in which a measuring segment 100 according to the present invention is shown schematically in side view.

The measuring segment 100 includes a load cell 102 that comprises an outer ring 110, a concentric inner ring 112 arranged spaced apart axially and an axial measuring section 114. The inner ring 112 sits with little tolerance on the axle 22, indicated in the figure with dashed lines, such that it can be slid along the axle in the untensioned state. The outer ring 110 bears exteriorly the bearing retainer for the rolling bearing 38, on whose exterior circumference the roll shell 34 is attached.

The outer ring 110 and the inner ring 112 are connected by an axial measuring section 114 that, in the exemplary embodiment, comprises a substantially H-shaped recess 116 and forms a double-bending beam that is furnished with strain gauges 62 for measuring the tensions of the measuring section 114. The tolerance of the outer ring 110 with respect to the axle 22 is dimensioned such that, in the event of overload, the outer ring rests against the axle 22 and, in this way, prevents any destruction of the load cell 102.

If, due to the web tension, a force 64 presses on the roll shell 34 of the measuring segment 100, the force is transmitted via the rolling bearing to the outer ring 110, which rests on the inner ring 112 via the measuring section 114. The tensions produced in this way in the measuring section 114 are measured by the strain gauges 62, and the electrical signals produced are, as already generally described above, preamplified, if applicable digitalized, and passed into the power lines of the axle 22. The fixation of the measuring segments 100 on the axle can occur, for example, mechanically or pneumatically, as likewise already described above.

In addition to the measuring of the web tensions of cut longitudinal strips of a material web, the force measuring device according to the present invention permits, through the independent web tension measurement of the measuring segments, also the recording of a tension profile of an uncut material web.

For this, with reference to FIG. 10, the measuring segments 32 of the force measuring device 20 are positioned and locked on the axle 22 in such a way that their roll shells 34 are adjacent practically without gaps without touching each other (reference sign 120). To ensure this, the measuring segments 32 are furnished with lateral spacers 40 (FIG. 5) whose size is coordinated with the size of the respective roll shell 34 in such a way that, when the measuring segments 32 are pushed together, the desired side-by-side arrangement 120 practically without gaps with mutual clearances of the roll shells of a few tenths of a millimeter is achieved.

Since every measuring segment 32 measures the local web tension BZ(x) at the location x of the respective measuring segment along the transverse direction Q of the material web, a tension profile 122 of the material web can be measured with the plurality of measuring segments 32, as depicted schematically in FIG. 11. In the tension profile diagram shown there, the local web tension Bz(x) is plotted over the spatial coordinate x in the transverse direction of the material web. From the knowledge of the tension profile, suitable measures can then be derived, for example for a non-uniform profile, control measures can be taken that lead to a more uniform tension profile. If the temporal progression of the local web tension is displayed, for instance, in a waterfall diagram, also periodic signals, such as non-round supply reels, periodic wrinkling and the like can be easily identified.

The width of the measuring segments 32 used for the tension profile measurement can be identical, as in the exemplary embodiment in FIG. 10, but it can also be expedient to use measuring segments 32 of different widths. For example, in the middle region of the material web, measuring segments having narrower roll shells than at the edge regions of the material web can be used.

It can be determined whether slip occurs in one or more measuring segments by measuring the rotational speed of the individual measuring segments 32. Here, the fastest-rotating segment in each case provides the reference value. To determine the rotational speed of the measuring segments 32, there can, for example, be mounted in each measuring segment, via a mount 130 on the roll shell 34, two magnets 132 offset from each other by 180°, as depicted in FIG. 3. The load cell 36 is furnished at a suitable location with a Hall effect generator which the magnets 132 periodically run past when the roll shell 34 rotates and produce in the Hall effect generator a Hall voltage from whose temporal progression the rotational speed of the measuring segment can be determined. The signals of the Hall effect generator are conducted to the evaluation unit via the electronics unit (FIG. 8) and evaluated. For example, the rotational speed of the fastest rotating measuring segment is defined as the reference value, and for a measuring segment whose rotational speed falls below the reference value by a predetermined threshold value, a slip is displayed.

The invention claimed is:

1. A force measuring device for measuring web tensions of a running material web that comprises a longitudinal direction defined by the running direction, and a transverse direction, the force measuring device comprising an axle and, supported on the axle, a measuring roll wrapped around by the material web, characterized in that
the measuring roll is formed as a segmented measuring roll having two or more measuring segments that are separately slidable on the axle and lockable in a measuring position on the axle in order to position the measuring segments in the transverse direction of the material web in accordance with desired measuring positions such that longitudinal sections of the material web wrap around one measuring segment each,
the measuring segments each comprise a load cell that serves to determine the web tension of the longitudinal section of the material web wrapped around the respective measuring segment and that provides a mount with which the measuring segment sits on the axle, and
the axle is furnished with electrical conductors that extend substantially in the axial direction across the entire width, that are contactable at every position axially and with which the measuring signals provided by the load cells of the measuring segments are conductible to an evaluation unit arranged at an axle end.

2. The force measuring device according to claim 1, characterized in that the measuring segments comprise, in addition to the load cell, a roll shell and, supported by the load cell, a bearing for the roll shell.

3. The force measuring device according to claim 2, characterized in that the measuring segments are each furnished with a device for measuring the rotational speed, the device comprising one or more magnets that rotate with the roll shell of the measuring segment, and a static Hall effect generator connected with the load cell of the measuring segment.

4. The force measuring device according to claim 1, characterized in that the load cell comprises, in each case, an inner ring lying on the axle and providing the said mount, a concentric outer ring that is slidable with respect to the inner ring and a measuring section that connects the inner ring and the outer ring in a connecting region.

5. The force measuring device according to claim 4, characterized in that the inner ring comprises an indentation in which the connecting region with the outer ring is accommodated.

6. The force measuring device according to claim 5, characterized in that the load cell is guided in an axial guide chamber in the axle with the indentation of the inner ring.

7. The force measuring device according to claim 4, characterized in that the inner ring and the outer ring are arranged radially nested and are connected in a radial connecting region by the measuring section.

8. The force measuring device according to claim 4, characterized in that the inner ring and the outer ring are arranged axially spaced apart and are connected in an axial connecting region by the measuring section.

9. The force measuring device according to claim 4, characterized in that the measuring section is formed in the form of a double-bending beam.

10. The force measuring device according to claim 4, characterized in that the inner ring, the outer ring and the measuring section of the load cell are formed to be one piece.

11. The force measuring device according to claim 1, characterized in that the load cell is furnished with strain gauges for measuring the web tension, the measuring section connecting an inner ring and an outer ring being furnished with the said strain gauges for measuring the mechanical tension produced in the measuring section.

12. The force measuring device according to claim 11, characterized in that the measuring segments each include an electronics unit for supplying the strain gauges and for receiving, for preamplifying, in addition to digitalizing, and for passing the preamplified and, if applicable, digitalized measuring signals into the electrical lines.

13. The force measuring device according to claim 11, characterized in that the measuring segments each include an electronics unit for supplying the strain gauges and for receiving, for preamplifying, in addition to digitalizing, and for passing the preamplified and, if applicable, digitalized measuring signals into the power rails in the axle.

14. The force measuring device according to claim 1, characterized in that the axle is formed as an extruded profile that comprises a vertical ridge and two horizontal guide rails that extend from the vertical ridge, the vertical ridge and the two guide rails forming a U-shaped axial guide chamber in the extruded profile of the axle.

15. The force measuring device according to claim 1, characterized in that the axle in an axial guide chamber is furnished with axially running power rails that are contactable at an arbitrary axial position of current collectors in the load cells of the measuring segments and that form the said electrical conductors.

16. The force measuring device according to claim 1, characterized in that the axle includes, in an axial groove, an air hose and a pressure strip for locking the measuring segments on the axle, in that the evaluation unit includes a pressure sensor for monitoring the air pressure of the air hose.

17. The force measuring device according to claim 1, characterized in that two or more measuring segments are positioned and locked on the axle.

18. The force measuring device according to claim 17, characterized in that the measuring segments for measuring the web tensions of the longitudinal strips of a cut running material web are positioned and locked on the axle with spaced apart roll shells.

19. The force measuring device according to claim 17, characterized in that the measuring segments for measuring the web tensions of the longitudinal sections of an uncut running material web are positioned and locked on the axle in such a way that their roll shells are adjacent practically without gaps without touching each other.

20. The force measuring device according to claim 1, characterized in that three or more measuring segments are positioned and locked on the axle.

* * * * *